United States Patent [19]

Szalavitz

[11] 4,204,875

[45] May 27, 1980

[54] CEMENTITIOUS COMPOSITIONS

[75] Inventor: Miklos Szalavitz, Warwick, N.Y.

[73] Assignee: Sterling Drug Inc., New York, N.Y.

[21] Appl. No.: 809,057

[22] Filed: Jun. 22, 1977

[51] Int. Cl.$^2$ .............................................. C04B 7/02
[52] U.S. Cl. ................................................... 106/87
[58] Field of Search ............................. 106/86, 87, 88

[56] References Cited

U.S. PATENT DOCUMENTS

| 1,902,993 | 3/1933 | Ellerbeck | 106/87 |
| 2,024,791 | 12/1935 | Adolph et al. | 106/87 |
| 2,318,754 | 5/1943 | Cavadino | 106/87 |
| 2,371,928 | 3/1945 | Schneider | 106/87 |
| 3,729,328 | 4/1973 | Magder | 106/87 |

OTHER PUBLICATIONS

Chemical Abstracts, vol. 70, 1969, 90517w.

*Primary Examiner*—J. Poer
*Attorney, Agent, or Firm*—Frederik W. Stonner; B. Woodrow Wyatt

[57] ABSTRACT

A method for preventing shrinkage of alkaline aqueous hydraulic cementitious mixtures during setting and hardening which comprises incorporating in the mixtures a monopersulfate salt, or a monopersulfate salt together with at least one peroxygen compound other than the monopersulfate salt; and hydraulic cement compositions for preparing such alkaline aqueous hydraulic cementitious mixtures. The monopersulfate salt, or monopersulfate salt together with at least one peroxygen compound other than monopersulfate salt, generates sufficient oxygen gas during setting and hardening of the alkaline aqueous hydraulic cementitious mixture to provide controlled expansion of the mixture.

32 Claims, No Drawings

CEMENTITIOUS COMPOSITIONS

BACKGROUND OF THE INVENTION

1. Field of the Invention

This invention relates to a method for preventing shrinkage and causing controlled expansion of aqueous hydraulic cementitious mixtures during setting and hardening, and to novel hydraulic cement compositions for the preparation of aqueous hydraulic cementitious mixtures which will not shrink on setting and hardening.

As used herein, the term "hydraulic cement" means those cements which are mixed with water to form mixtures which have the property of setting and hardening under water, such as gypsum cement, high alumina cements, Portland cements, blast-furnace cements, Kline cements and mixtures of such cements.

As used herein, the term "hydraulic cement mix" refers to a composition containing at least one hydraulic cement and to mixtures thereof with aggregate, i.e., sand or sand and larger stone particles, which when mixed with water forms grout, mortar or concrete. The terms "grout", "mortar" and "concrete" refer in the case of "grout" to a mixture of hydraulic cement with water or with water and fine sand; in the case of "mortar" to a mixture of hydraulic cement, water and sand; and in the case of "concrete" to a mixture of hydraulic cement, water, sand and larger stone particles.

As used herein the terms "preventing shrinkage" and "causing controlled expansion" mean compensating for the shrinkage which normally occurs on setting and hardening of aqueous cementitious mixtures. Thus by "preventing shrinkage" or "causing controlled expansion" of an aqueous cementitious mixture there is obtained a set and hardened cementitious mass the volume of which is essentially equal to or greater than the original volume of the mixture, that is, the volume of the final set and hardened mass is at least equal to that of the aqueous cementitious mixture prior to the setting and hardening process.

2. Description of the Prior Art

Hydraulic cements are widely employed in the construction industry and, of these, Portland cement is most commonly used because of its relatively low cost, availability in large quantities, and durability under most environmental conditions. However, one major problem in the use and over-all utility of Portland cement is that aqueous cementitious mixtures derived therefrom normally undergo shrinkage on setting and hardening, a factor contributing to cracking. To overcome this problem, expansion hydraulic cements have been developed in which the hydraulic cement is blended with an expansive agent. When water is mixed with such blends, the expansive agent functions to at least compensate for the shrinkage which, in the absence of the expansive agent, normally would occur during setting and hardening of the resulting aqueous cementitious mixture. Hydraulic cement shrinkage compensating agents which are disclosed in the prior art are ettringite precursors, aluminum powder, iron filings, fluidized coke and particulate porous materials such as activated alumina, activated bauxite, activated silica gel and activated carbon. The manner in which such agents function as well as the shortcomings of certain of these agents are discussed in U.S. Pat. Nos. 3,503,767, 3,519,449, Re. 26,597, 3,794,504 and 3,890,157. Briefly, aluminum powder and the particulate absorbent materials noted above compensate for shrinkage by liberating gas during setting and early hardening of the aqueous hydraulic cementitious mixtures. In the case of aluminum powder, hydrogen gas is generated as a result of the reaction of the aluminum powder under the alkaline conditions present in the cementitious mixtures. In the case of fluid coke and particulate porous materials, absorbed gas is released. Iron filings compensate for shrinkage as a result of internal expansion due to oxidation. Ettringite, formed from the ettringite precursor during hydration of the cement, is a source of expansive force.

The addition to settable aqueous cementitious mixtures and inorganic settable mixtures of agents which evolve oxygen gas during setting is disclosed in U.S. Pat. Nos. 1,902,993, 2,167,606, 2,662,825 and 3,095,312. U.S. Pat. No. 1,902,993 discloses the incorporation, as oxygen generating agent, of alkali metal perborate and alkali earth metal perborate in aqueous cementitious mixtures which set through hydration or crystallization, gypsum being specifically disclosed, for the purpose of rendering the set product permanently cellular or porous and hence sound absorptive and less dense than would be the case without addition of the perborate. U.S. Pat. No. 2,167,606 discloses the use in aqueous hydraulic cementitious mixtures of a mixture of barium peroxide with another agent such as manganese peroxide, permanganate or chromic acid, as well as an acidic substance to promote decomposition of the peroxide, for the purpose of forming, as a result of the oxygen gas generated by the peroxide mixture during initial setting of the cementitious mixture, pores, voids, cells or gaps in the mass resulting in a product of high acoustical and thermal value. U.S. Pat. No. 2,662,825 discloses the incorporation, as oxygen gas generating agent, of an inorganic peroxide such as hydrogen peroxide or a persalt capable of generating hydrogen peroxide and a decomposing agent for the peroxide in an aqueous slurry consisting of a mixture of a refractory material and an inorganic settable material, such as calcined gypsum for the purpose of producing, as a result of oxygen gas release during initial setting, a foamy, plastic mass which can be formed, for example, by being cast into molds, for subsequent firing to provide porous ceramic products having improved strength and excellent insulating and refractory properties. U.S. Pat. No. 3,095,312 discloses the use, as oxygen generating agent, of a peroxy compound such as an alkali metal peroxide or alkali metal perborate in inorganic silicate containing settable compositions for the purpose of producing, as a result of the oxygen gas generated during setting of the composition, a highly foamed silicate product for use as a foamed-in-place thermal insulator or in making temporary molds. None of the foregoing-noted patents disclose the use of oxygen generating compounds in aqueous cementitious mixtures for the purpose of compensating for the shrinkage which normally occurs during setting or hardening, or the use specifically or monopersulfate salts as oxygen generating agents in aqueous cementitious mixtures.

U.S. Pat. No. 3,337,466 discloses that when the acidic nature of an aqueous solution of potassium monopersulfate, which is relatively stable, is slowly changed by addition of a base, free oxygen becomes available in the solution when the pH approaches 7 and that the rate at which it becomes available reaches a maximum at pH of about 9, but that the rate at which the free oxygen becomes soluble in the solution is greater than the rate at which it becomes available; the patent further discloses that a combination or mixture of potassium monopersulfate with certain other peroxygen compounds, such as sodium perborate, in aqueous solutions at a pH of 7 or above produces a highly effervescent flow of oxygen and teaches the use of such combinations and mixtures in compositions for sterilizing, cleansing and bleaching various materials such as dentures. No other uses are disclosed for such mixtures and combinations.

SUMMARY OF THE INVENTION

It has been discovered that when a monopersulfate salt is incorporated in an appropriate amount in alkaline aqueous hydraulic cementitious mixtures which have the property of setting into a hard mass, oxygen gas is generated in an amount and at a rate sufficient to prevent the shrinkage normally associated with the setting and hardening of the mixtures. Furthermore it has been found that if at least one other peroxygen compound in addition to the monopersulfate salt is incorporated in alkaline aqueous hydraulic cementitious mixtures, the rate at which the oxygen gas is generated and the degree of expansion of the cementitious mixtures is substantially greater than is the case when equivalent amounts of either the monopersulfate salt alone or the other peroxygen compound alone is employed.

Thus in one composition aspect of the invention there is provided a hydraulic cement composition which on mixing with water forms an alkaline aqueous hydraulic cementitious mixture which has the property of setting into a hard mass the volume of which is at least as great as the original volume of the mixture, comprising in admixture a hydraulic cement mix and an agent which generates oxygen gas under the alkaline conditions of the mixture, where said agent is a monopersulfate salt and is present in an amount which will generate sufficient oxygen gas to prevent shrinkage of the mixture during setting and hardening.

In another composition aspect of the invention there is provided a hydraulic cement composition which on mixing with water forms an alkaline aqueous hydraulic cementitious mixture which has the property of setting into a hard mass the volume of which is at least as great as the original volume of the mixture, comprising in admixture a hydraulic cement mix and an agent which generates oxygen gas under the alkaline conditions of the mixture, where said agent comprises a monopersulfate salt and at least one peroxygen compound other than the monopersulfate salt selected from the group consisting of inorganic peroxides of metals of Groups I and II of the Periodic Table, alkali metal salts of inorganic peroxy acids, ammonium salts of inorganic peroxy acids and urea peroxide, said agent being present in an amount which will generate sufficient oxygen gas to prevent shrinkage of the mixture during setting and hardening.

In a process aspect of the invention there is provided a method for preventing shrinkage during setting and hardening of an alkaline aqueous hydraulic cementitious mixture obtained by mixing water with a hydraulic cement mix which comprises incorporating in said mixture an agent which generates oxygen gas under the alkaline conditions of the mixture, where said agent is a monopersulfate salt and is present in an amount which will generate sufficient oxygen gas to prevent shrinkage of the mixture during setting and hardening.

In another process aspect of the invention there is provided a method for preventing shrinkage during setting and hardening of an alkaline aqueous hydraulic cementitious mixture obtained by mixing water with a hydraulic cement mix which comprises incorporating in said mixture an agent which generates oxygen gas under the alkaline conditions of the mixture, where said agent comprises a monopersulfate salt and at least one peroxygen compound other than the monopersulfate salt selected from the group consisting of inorganic peroxides of metals of Groups I and II of the Periodic Table, alkali metal salts of inorganic peroxy acids, ammonium salts of inorganic peroxy acids and urea peroxide, said agent being present in an amount which will generate sufficient oxygen gas to prevent shrinkage of the mixture during setting and hardening.

DETAILED DESCRIPTION INCLUSIVE OF THE PREFERRED EMBODIMENTS

The monopersulfate salt which is employed in the compositions and methods of the invention may be any of the solid monopersulfates or mixtures thereof, such as the alkali metal monopersulfates, e.g., potassium and sodium monopersulfate, and ammonium monopersulfate. A preferred monopersulfate is potassium monopersulfate, especially the triple salt of potassium monopersulfate, represented by the formula $2KHSO_5 \cdot KHSO_4 \cdot K_2SO_4$, which is commercially available under the trademark OXONE.

In the composition aspect of the invention where a peroxygen compound other than the monopersulfate salt is employed in addition to the monopersulfate salt, there can be employed any inorganic peroxide of metals of Groups I and II of the Periodic Table and alkali metal and ammonium salts of inorganic peroxy acids which are stable in the presence of the other ingredients present in the composition prior to addition of water thereto. Such peroxides and peroxy acids are well known and described in the art, see for example Inorganic Chemistry by Therald Moeller, John Wiley & Sons, Inc., 1952, pp. 507-513. Preferred peroxygen compounds are the alkali metal perborates, particularly sodium perborate which may be represented by the molecular formula $NaBO_3 \cdot nH_2O$ where n is 1 or 4.

The degree of expansion to be achieved with the compositions of the invention will depend on the purpose for which the compositions of the invention are intended to be used. For many purposes, e.g., for anchoring posts, rods, bolts, machinery, etc., the use of compositions which provides aqueous cementitious mixtures which have the property of setting into a hard mass the volume of which, rather than being essentially equal to, is greater than the original aqueous cementitious mixture generally will be preferred; the expanding action of the aqueous cementitious mixtures derived from such compositions on setting and hardening in the confined spaces in which they are employed exert forces which result in greater bond and pullout strength.

The degree of expansion which will occur on setting and hardening of the alkaline aqueous hydraulic cementitious mixtures prepared from the compositions and in accordance with the methods of the invention will depend on the amount of oxygen gas generated during the setting and hardening process which in turn will depend on the nature and amount of oxygen gas generating agent employed. The amount of oxygen gas generating agent to be employed to provide the desired amount of oxygen gas will depend on the characteristics of the particular alkaline aqueous hydraulic cementitious mixture, i.e., on the viscosity, flowability, set time, additives, nature of the cement, etc, and on the degree of expansion desired. When a monopersulfate salt is employed as the sole precursor of the oxygen gas, shrinkage can be prevented and controlled expansion can be achieved by employing an amount thereof in the range of from about 0.001 to 10 percent by weight of the composition which, calculated on the basis of the molecular formula of the particular monopersulfate salt used, corresponds to active oxygen in the range of from about 0.0001 to about 1 percent by weight of the composition. When a peroxygen compound other than and in addition to the monopersulfate salt is employed, shrinkage can be prevented and controlled expansion can be achieved by employing an amount of the monopersulfate salt which contains active oxygen in the range of from about 0.0001 to 1 percent by weight of the composition and an amount of the other peroxygen compound which, calculated on the basis of the molecular formula of the particular peroxygen compound employed, contains active oxygen in the range of from about 0.0002 to 2 percent by weight of the composition. The monopersulfate salt and other peroxygen compound can be employed in any ratio consistent with the above-defined ranges of percent by weight of the composition of active oxygen.

The degree and rate of expansion also can be controlled by addition to the compositions of the inventions or to the alkaline aqueous hydraulic cementitious mixtures derived therefrom of absorbents such as activated carbon, silica gel, and the like. Such absorbents function by absorbing some of the oxygen gas which is generated and subsequently releasing the oxygen gas through desorbtion, thus controlling the rate of expansion. The degree of expansion can also be controlled by the addition of retarders and accelerators which regulate the "set time". Other ingredients can also be added as modifiers such as water reducers, i.e., an agent which reduces the amount of water required to achieve a certain consistency of the aqueous hydraulic cementitious mixtures, hardeners, waterproofers and the like.

In practicing the methods of the invention the monopersulfate salt and the other peroxygen compound, if the latter is to be employed in addition to the monopersulfate salt, as well as any other additives to be employed, can be mixed with the hydraulic cement mix in the dry state, i.e., before water is added, so as to provide a composition to which only water need be added to prepare the alkaline aqueous hydraulic cementitious mixture for ultimate use. Although this method is preferred, the monopersulfate salt and the other peroxygen compound, if such is to be employed, as well as any other additives, if desired, can be added at the time the water is added to the hydraulic cement mix.

The invention is illustrated by the following examples without, however, being limited thereto.

EXAMPLES 1A TO 1D

These examples demonstrate the volume changes which occur on setting and hardening of alkaline aqueous hydraulic cementitious mixtures prepared from two hydraulic cement compositions of the invention (Examples 1A and 1B), the first (1A) where potassium monopersulfate is employed as the sole oxygen gas generating agent, and the second (1B) where a combination of potassium monopersulfate and sodium perborate are employed as the oxygen gas generating agent, as well as from hydraulic cement compositions where sodium perborate is the sole oxygen gas generating agent employed (1C) and where no oxygen gas generating agent is employed (1D). The procedures employed in the preparation of the mixtures of Examples 1A to 1D and the conditions under which these mixtures were allowed to set and harden were the same in each case.

| Composition | Parts by Weight | | | |
| --- | --- | --- | --- | --- |
| | A | B | C | D |
| Portland Cement Type III | 50.0 | 50.0 | 50.0 | 50.0 |
| Sand[1] | 49.2 | 49.2 | 49.2 | 49.3 |
| Water reducer[2] | 0.7 | 0.7 | 0.7 | 0.7 |
| Potassium monopersulfate[3] | 0.1 | 0.05 | 0 | 0 |
| Sodium perborate[4] | 0 | 0.05 | 0.1 | 0 |
| Water-Cement Ratio (ml/g) | 15/100 | 15/100 | 15/100 | 15/100 |
| % Length Change (24 hours) | +0.30 | +1.35 | +0.80 | −0.75 |

[1]Michigan No. 2
[2]Melment F10 (Trademark - available from American Admixtures Corporation, Chicago, Il, Division of Chicago Fly Ash Co.)
[3]Parts of OXONE (Trademark - a monopersulfate compound available from E. I. duPont de Nemours and Co. Inc. as a mixture containing approximately 50 mole percent potassium monopersulfate, 25 molepercent potassium hydrogen sulfate and 25 mole percent potassium sulfate; available oxygen 4.5%)
[4]Parts of commercially available $NaBO_3 \cdot 4H_2O$; available oxygen approx. 10.3%

The "% length change" in the above examples, as well as the examples hereinbelow, reflects in each case the volume change of the alkaline aqueous hydraulic cementitious mixture on setting and hardening and was determined for all examples by the following procedure:

The hydraulic cement composition is mixed with the appropriate amount of water (expressed herein as water-cement ratio) and the resulting alkaline aqueous hydraulic cementitious mixture then is placed in a 2×5.5 inch non-absorbent cylinder. A glass slide then is placed on the surface of the mixture and the change in length in inches during setting and hardening is measured at specified time intervals on a height gauge, calibrated in 0.001 inches, by means of a "feeler arm" which provides communication between the glass slide and the gauge.

A comparison of the "% length change" in Examples 1A to 1D shows that shrinkage occurred in the absence of a peroxygen compound whereas expansion occurred in the presence of a peroxygen compound. Furthermore, it can be seen that when a combination of monopersulfate and perborate was employed as oxygen generating agent (1B), the expansion which occurred was 350 percent greater than when monopersulfate alone was employed (1A) and 68 percent greater than when perborate alone was employed (1C), even though the available oxygen in Example 1B is only 64 percent greater than in Example 1A and is 28 percent less than in Example 1C. The much greater degree of expansion in Example 1B is due to the increased rate of generation of oxygen gas and amount of oxygen gas generated during the setting and hardening period. Thus the much greater degree of expansion in Example 1B as compared to the expansion in Examples 1A and 1C demonstrates a synergistic effect on oxygen gas generation in alkaline aqueous hydraulic cement mixtures when a peroxygen compound other than monopersulfate is employed in addition to monopersulfate. Because of this synergistic effect, the use of the combination of monopersulfate with the other peroxygen compound has advantages in certain cases over the use of monopersulfate alone. For example, the use of the combination of monopersulfate with the other peroxygen compound is preferred in compositions of the fast-set type where a rapid rate of oxygen gas generation, such as would be provided by the combination, is essential to ensure that a volume of oxygen gas will be generated prior to completion of the setting and hardening process sufficient to achieve the desired degree of expansion. The use of the combination of monopersulfate with the other peroxygen compound is also preferred when the cementitious compositions are to be employed at lower temperatures, i.e., 40°–50° F., in order to ensure that the desired degree of expansion is achieved during setting and hardening, since the rate of oxygen gas generation at the lower temperatures is significantly decreased in the case of monopersulfate alone but is not significantly changed in the case of the combination.

EXAMPLES 2A TO 2C

These examples are of compositions of the invention which each contain equal amounts of cement and sand but different amounts of monopersulfate and perborate; in each case the water-cement ratio was the same.

| Composition | Parts by Weight | | |
|---|---|---|---|
|  | A | B | C |
| Portland Cement Type III | 49.0 | 49.0 | 49.0 |
| Sand[1] | 50.0 | 50.0 | 50.0 |
| Potassium monopersulfate[2] | 0.50 | 0.20 | 0.10 |
| Sodium perborate[3] | 0.50 | 0.20 | 0.10 |
| Water-Cement Ratio (ml/g) | 28/100 | 28/100 | 28/100 |
| % Length Change (24 hours) | +3.2 | +2.0 | +0.50 |

[1]Michigan No. 2 and Portrige 1630 in ratio of 3:1 respectively
[2]Parts of OXONE (see Example 1)
[3]Parts of commercially available NaBO$_3$ . 1H$_2$O; available oxygen approx. 15.7%

Examples 2A to 2C demonstrate that the degree of expansion can be controlled by varying only the amount of peroxygen compounds employed; the greater the amount of peroxygen compound employed the greater the expansion that is achieved.

EXAMPLES 3A TO 3D

These examples are of compositions which each contain equal amounts of cement and sand and additionally a "water reducer"; in each case the water-cement ratio was the same. Only Examples 3A to 3C represent compositions of the invention, Example 3D, which contains no peroxygen compound, being included for comparison with respect to volume change.

| Composition | Parts by Weight | | | |
|---|---|---|---|---|
|  | A | B | C | D |
| Portland Cement Type III | 49.3 | 49.3 | 49.3 | 49.3 |
| Sand[1] | 50.0 | 50.0 | 50.0 | 50.0 |
| Potassium monopersulfate[2] | 0.015 | 0.020 | 0.030 | 0 |
| Sodium perborate[3] | 0.015 | 0.020 | 0.030 | 0 |
| Water Reducer[4] | 0.65 | 0.65 | 0.65 | 0.65 |
| Water-Cement Ratio (ml/g) | 14/100 | 14/100 | 14/100 | 14/100 |
| % Length Change: | | | | |
| 1 hour | +0.62 | +0.95 | +1.95 | −0.44 |
| 24 hours | +0.51 | +0.68 | +1.88 | −0.8 |

[1]Michigan No. 2 and Portrige 1630 in ratio of 3:1 respectively
[2]Parts of OXONE (see Example 2)
[3]Parts of commercially available NaBO$_3$ . 1H$_2$O (see Example 2)
[4]Melment F10 (see Example 1)

Examples 3A to 3C again demonstrate that the degree of expansion can be controlled by varying the amount of the peroxygen compounds employed. In the case of Example 3D where no peroxygen compound was employed, shrinkage occurred.

EXAMPLES 4A TO 4C

These examples are of compositions of the invention in which all ingredients are present in equal amounts but where in each case, in the preparation of the aqueous hydraulic cementitious mixture, the ratio of water to cement was varied.

| Composition | Parts by Weight | | |
|---|---|---|---|
|  | A | B | C |
| Portland Cement Type III | 44.16 | 44.16 | 44.16 |
| Sand[1] | 55.10 | 55.10 | 55.10 |
| Potassium monopersulfate[2] | 0.03 | 0.03 | 0.03 |
| Sodium perborate[3] | 0.03 | 0.03 | 0.03 |
| Water Reducer[4] | 0.675 | 0.675 | 0.675 |
| Water-Cement Ratio (ml/g) | 15/100 | 14/100 | 13/100 |
| % Length Change: | | | |
| −1 hour | +2.45 | +2.04 | +1.52 |
| −24 hours | +2.07 | +1.75 | +1.26 |
| Set Time | 2 hours | 2 hours | 2 hours |

[1]Michigan No. 2 (41.6 parts) and Portrige 1630 (13.5 parts)
[2]Parts of OXONE (see Example 1)
[3]Parts of commercially available NaBO$_3$ . 1H$_2$O (see Example 2)
[4]Melment F10 (see Example 1)

Examples 4A to 4C demonstrate that the degree of expansion may be controlled by varying the consistency of the aqueous hydraulic cementitious mixture, more fluid mixtures being obtained as the amount of water is increased. As will be noted, the greater the water-cement ratio, the greater was the degree of expansion achieved. It is well known that, in the absence of an expansive agent, the degree of shrinkage of aqueous hydraulic cementitious mixtures on setting and hardening is greater the greater the water-cement ratio.

The strength properties of the hardened cementitious product resulting from Example 7C were measured and found to be excellent. The data is as follows:

Compressive Strength 6 hours—450 psi
24 hours—6000 psi
7 days—11000 psi

Tensile Strength 7 days—460 psi

Flexural Strength 7 days—1200 psi

EXAMPLE 5

This example is of a composition of the invention which contains a calcium aluminate cement in addition to a Portland cement and is of the "quick set" type.

| | Parts by Weight |
|---|---|
| Portland Cement Type III | 47.1 |
| Calcium Aluminate Cement[1] | 5.0 |
| Sand[2] | 47.1 |
| Potassium monopersulfate[3] | 0.05 |
| Sodium perborate[4] | 0.05 |
| Water Reducer[5] | 0.7 |
| Water-Cement Ratio (ml/g) | 14/100 |
| Set time | 20 minutes |
| % Length Change: | |
| 1 hour | +0.83 |
| 24 hours | +0.68 |

| | Parts by Weight |
|---|---|
| Compressive Strength (24 hours) | 6000 psi |

[1] Refcon (Trademark - available from Universal Atlas Cement, Division of U.S. Steel Corporation)
[2] Michigan No. 2
[3] Parts of OXONE (see Example 1)
[4] Parts of NaBO$_3$ . 1H$_2$O (see Example 2)
[5] Melment F10 (see Example 1)

EXAMPLES 6A AND 6B

These examples are of compositions of the invention of the slow-set type (6A) and fast-set type (6B).

| | Parts by Weight | |
|---|---|---|
| | A | B |
| Portland Cement Type III | 44.160 | 39.130 |
| Calcium Aluminate Cement[1] | 0 | 5.00 |
| Sand[2] | 55.105 | 55.100 |
| Potassium monopersulfate[3] | 0.030 | 0.050 |
| Sodium perborate[4] | 0.030 | 0.050 |
| Water Reducer[5] | 0.675 | 0.675 |
| Water-Cement Ratio (ml/g) | 14.5/100 | 14.5/100 |
| Initial Set Time (minutes) | 60 | 15-20 |

[1] Refcon (see Example 5)
[2] Michigan No. 2
[3] Parts of OXONE (see Example 1)
[4] Parts of commercially available NaBO$_3$ . 1H$_2$O (see Example 2)
[5] Melment F10 (see Example 1)

The pullout strengths of the cementitious products derived from the compositions of Examples 6A and 6B were measured and found to be excellent. The procedure employed was as follows:

Pullout tests were performed on concrete cubes 1 yd. × 1 yd. × 1 yd. cured a minimum of 28 days. Holes were drilled with a diamond core driller and walls were smooth. Two bolts and two rods of each size were then grouted in their respective holes with a grout mix of 7 qts. of water per 100 lbs. of composition.

The method used to perform the pull-out tests of the rods and the bolts consisted of a reinforced steel beam and saddle placed in its center which was then attached to the bolt or rod tested. One end was supported by steel blocking, the other end was placed on a hydraulic jack which was calibrated to read load applied in pounds to the beam. Load was applied slowly to the beam until failure occurred and the maximum load noted.

The pullout strength data for Examples 6A and 6B was as follows:

1. ⅞" diameter × 8" long A325 bolts with washer at bottom grouted 6" deep in a 1¼" diameter hole.

| Example | Specimen | Yield Load | Failure Load (lbs) | Type of Failure |
|---|---|---|---|---|
| 6A | 1 | — | 21,600 | bolt broke at thread |
| | 2 | — | 24,600 | bolt broke at thread |
| 6B | | — | 28,900 | bolt broke |

2. 1" diameter × 12" long A325 bolts with washer at bottom grouted 10" deep in a 2¼" diameter hole.

| Example | Specimen | Yield Load | Failure Load (lbs) | Type of Failure |
|---|---|---|---|---|
| 6A | 1 | — | 72,000 | concrete failed |
| | 2 | — | 81,000 | concrete failed |
| 6B | | — | 73,000 | — |

3. No. 4 deformed steel reinforcing rods grouted 8" deep in a 1" diameter hole.

| Example | Specimen | Yield Load | Failure Load (lbs) | Type of Failure |
|---|---|---|---|---|
| 6A | 1 | — | 24,400 | rod fractured |
| | 2 | — | 25,000 | rod fractured |
| 6B | | — | 26,500 | rod fractured |

4. No. 8 deformed steel reinforcing rods grouted 16" deep in a 2" diameter hole.

| Example | Specimen | Yield Load | Failure Load (lbs) | Type of Failure |
|---|---|---|---|---|
| 6A | 1 | — | 80,000 | rod fractured |
| | 2 | — | 74,000 | rod fractured |
| 6B | | — | 75,000 | rod fractured |

The compositions of the invention may also contain iron filings as an additional expansive agent. Iron filings expand as they become oxidized (rust). This rusting process proceeds for some time after setting and hardening of the aqueous cementitious mixture and thus can minimize "drying shrinkage" which normally occurs after setting and hardening. The following is an example of a composition of the invention which additionally contains iron filings.

EXAMPLE 7

| | Parts by Weight |
|---|---|
| Portland Cement Type III | 44.6 |
| Sand[1] | 44.6 |
| Potassium monopersulfate[2] | 0.05 |
| Sodium perborate[3] | 0.05 |
| Iron[4] | 10.00 |
| Water Reducer[5] | 0.70 |
| Water-Cement Ratio (ml/g) | 13/100 |
| % Length Change: | |
| 1 hour | +1.59 |
| 24 hours | +1.30 |
| Compressive Strength (24 hours) | 6000 psi |

[1] Michigan No. 2
[2] Parts of OXONE (see Example 1)
[3] Parts of NaBO$_3$ . 1H$_2$O (see Example 2)
[4] Iron C.S.A. 87A (brand of iron filings available from Connelly GPM Incorporated)
[5] Melment F10 (see Example 3)

I claim:

1. A hydraulic cement composition which on mixing with water forms an alkaline aqueous hydraulic cementitious mixture which has the property of setting into a hard mass the volume of which is at least as great as the original volume of the mixture, comprising in admixture a hydraulic cement mix and an agent which generates oxygen gas under the alkaline conditions of the mixture, where said agent is a monopersulfate salt and is present in an amount which will generate sufficient oxygen gas to prevent shrinkage of the mixture during setting and hardening.

2. A composition according to claim 1 wherein the monopersulfate salt is present in an amount which contains from about 0.0001 to about 1 percent by weight of the composition of available oxygen.

3. A composition according to claim 2 wherein the monopersulfate salt is present in an amount which contains from about 0.0008 to about 0.03 percent by weight of the composition of available oxygen.

4. A composition according to claim 1 which additionally includes iron filings.

5. A composition according to claim 4 wherein the monopersulfate salt is present in an amount which contains from about 0.0001 to about 1 percent by weight of the composition of available oxygen and which contains from about 5 to about 95 percent by weight of the composition of iron filings.

6. A composition according to claim 5 wherein the monopersulfate salt is present in an amount which contains from about 0.0008 to about 0.03 percent by weight of the composition of available oxygen.

7. A composition according to claim 1 wherein the oxygen gas generating agent additionally includes at least one peroxygen compound other than the monopersulfate salt selected from the group consisting of inorganic peroxides of metals of Groups I and II of the Periodic Table, alkali metal salts of inorganic peroxy acids, ammonium salts of inorganic peroxy acids and urea peroxide.

8. A composition according to claim 7 wherein the monopersulfate salt is present in an amount which contains from about 0.0001 to about 1 percent by weight of the composition of available oxygen and the other peroxygen compound is present in an amount which contains from about 0.0002 to about 2 percent by weight of the composition of available oxygen.

9. A composition according to claim 8 wherein the other peroxygen compound is selected from the group consisting of alkali metal perborates.

10. A composition according to claim 9 wherein the monopersulfate salt is present in an amount which contains from about 0.0008 to about 0.03 percent by weight of the composition of available oxygen and the alkali metal perborate is present in an amount which contains from about 0.002 to about 0.08 percent by weight of the composition of available oxygen.

11. A composition according to claim 10 wherein the alkali metal perborate is sodium perborate.

12. A composition according to claim 7 which additionally includes iron filings.

13. A composition according to claim 12 wherein the monopersulfate salt is present in an amount which contains from about 0.0001 to about 1 percent by weight of the composition of available oxygen, the other peroxygen compound is present in an amount which contains from about 0.0002 to about 2 percent by weight of the composition of available oxygen, and which contains from about 5 to about 95 percent by weight of the composition of iron filings.

14. A composition according to claim 13 wherein the other peroxygen compound is selected from the group consisting of alkali metal perborates.

15. A composition according to claim 14 wherein the monopersulfate salt is present in an amount which contains from about 0.0008 to about 0.03 percent by weight of the composition of available oxygen and the alkali metal perborate is present in an amount which contains from about 0.002 to about 0.08 percent by weight of the composition of available oxygen.

16. A composition according to claim 15 wherein the alkali metal perborate is sodium perborate.

17. A method for preventing shrinkage during setting and hardening of an alkaline aqueous hydraulic cementitious mixture obtained by mixing water with a hydraulic cement mix which comprises incorporating in said mixture an agent which generates oxygen gas under the alkaline conditions of the mixture, where said agent is a monopersulfate salt and is present in an amount which will generate sufficient oxygen gas to prevent shrinkage of the mixture during setting and hardening.

18. A method according to claim 17 wherein the monopersulfate salt is incorporated in an amount which contains from about 0.0001 to about 1 percent by weight of the cement mix of available oxygen.

19. A method according to claim 18 wherein the monopersulfate salt is incorporated in an amount which contains from about 0.0008 to about 0.03 percent by weight of the cement mix of available oxygen.

20. A method according to claim 17 wherein iron filings additionally are incorporated.

21. A method according to claim 20 wherein the monopersulfate salt is incorporated in an amount which contains from about 0.0001 to about 1 percent by weight of the cement mix of available oxygen, and the iron filings are incorporated in an amount of about 5 to about 95 percent by weight of the cement mix.

22. A method according to claim 21 wherein the monopersulfate salt is incorporated in an amount which contains from about 0.0008 to about 0.03 percent by weight of the cement mix of available oxygen.

23. A method according to claim 17 wherein the oxygen gas generating agent additionally includes at least one peroxygen compound other than the monopersulfate salt selected from the group consisting of inorganic peroxides of metals of Groups I and II of the Periodic Table, alkali metal salts of inorganic peroxy acids, ammonium salts of inorganic peroxy acids and urea peroxide.

24. A method according to claim 23 wherein the monopersulfate salt is incorporated in an amount which contains from about 0.0001 to about 1 percent by weight of the cement mix of available oxygen and the other peroxygen compound is incorporated in an amount which contains from about 0.0002 to about 2 percent by weight of the cement mix of available oxygen.

25. A method according to claim 24 wherein the other peroxygen compound is selected from the group consisting of alkali metal perborates.

26. A method according to claim 25 wherein the monopersulfate salt is incorporated in an amount which contains from about 0.0008 to about 0.03 percent by weight of the cement mix of available oxygen and the alkali metal perborate is present in an amount which contains from about 0.002 to about 0.08 percent by weight of the cement mix of available oxygen.

27. A method according to claim 26 wherein the alkali metal perborate is sodium perborate.

28. A method according to claim 23 wherein the iron filings additionally are incorporated.

29. A method according to claim 28 wherein the monopersulfate salt is incorporated in an amount which contains from about 0.0001 to about 1 percent by weight of the cement mix of available oxygen, the other peroxygen compound is incorporated in an amount which contains from about 0.0002 to about 2 percent by weight of the cement mix of available oxygen, and the iron filings are incorporated in an amount of about 5 to about 95 percent by weight of the cement mix.

30. A method according to claim 29 wherein the other peroxygen compound is selected from the group consisting of alkali metal perborates.

31. A method according to claim 30 where the monopersulfate salt is incorporated in an amount which contains from about 0.0008 to about 0.03 percent by weight of the cement mix of available oxygen and the alkali metal perborate is incorporated in an amount which contains from about 0.002 to about 0.08 percent by weight of the cement mix of available oxygen.

32. A method according to claim 31 wherein the alkali metal perborate is sodium perborate.

* * * * *